June 21, 1960  G. H. CORK  2,941,287
METHOD OF MAKING A UNIVERSAL JOINT
Original Filed Aug. 19, 1953  3 Sheets-Sheet 1
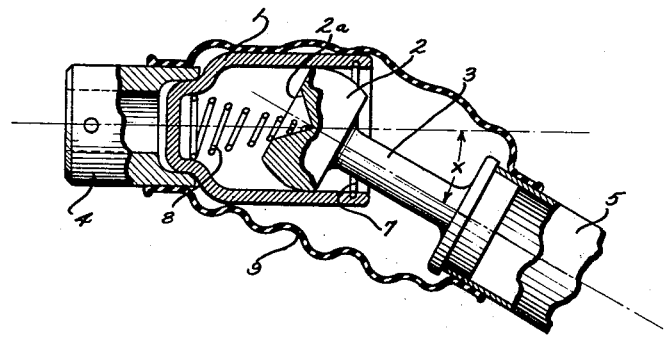
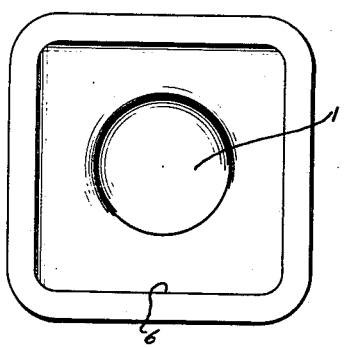
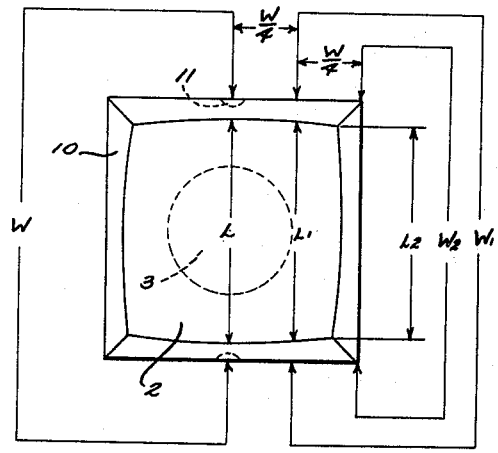
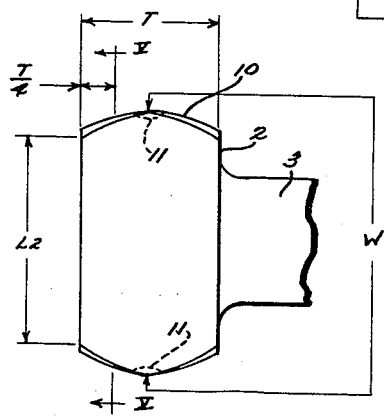
Inventor
GORDON H. CORK June 21, 1960  G. H. CORK  2,941,287
METHOD OF MAKING A UNIVERSAL JOINT
Original Filed Aug. 19, 1953  3 Sheets-Sheet 2
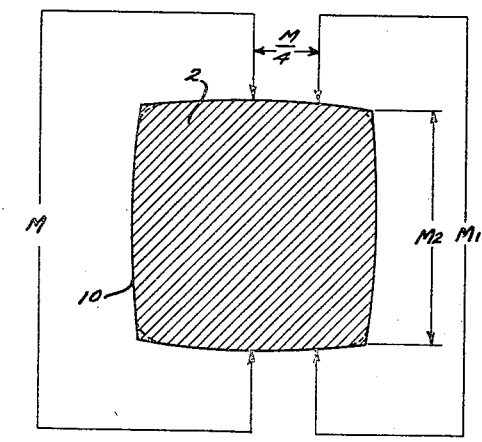
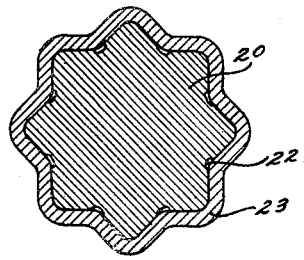
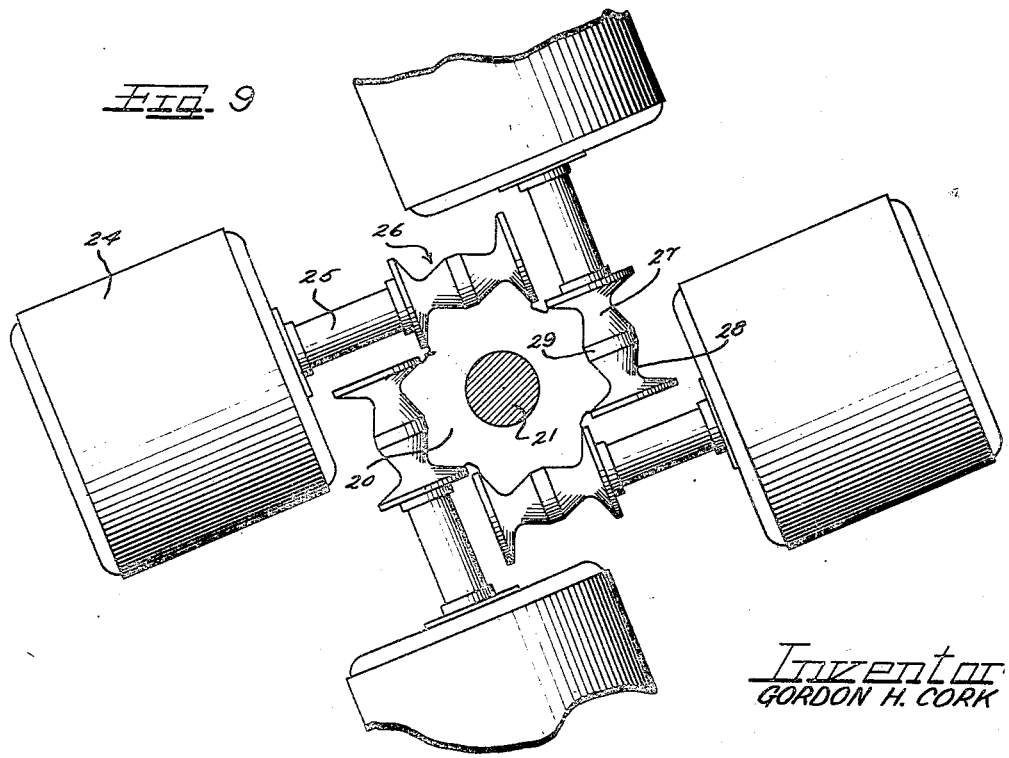
Inventor
GORDON H. CORK

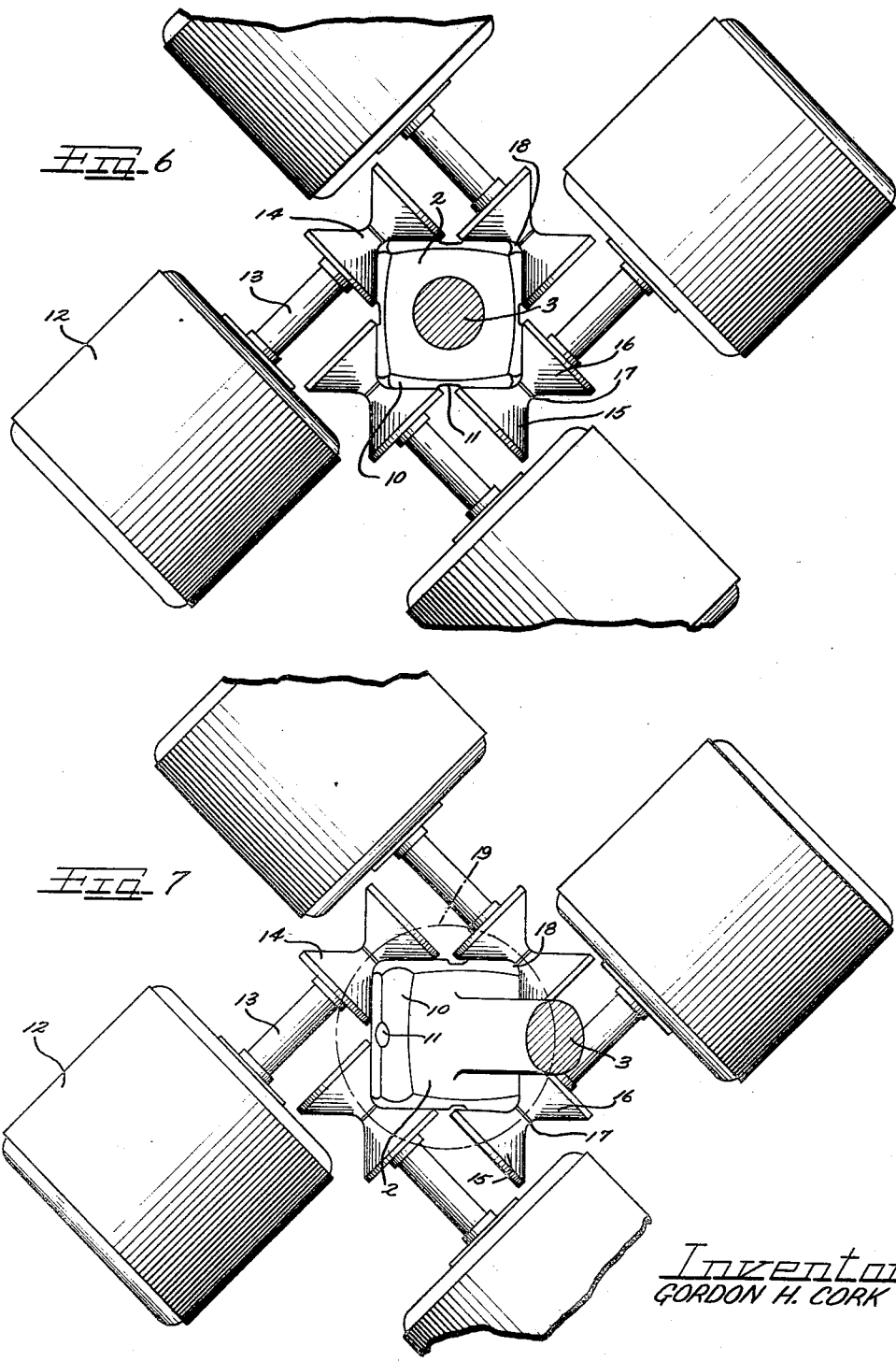

United States Patent Office 2,941,287
Patented June 21, 1960

2,941,287

METHOD OF MAKING A UNIVERSAL JOINT

Gordon H. Cork, Detroit, Mich., assignor to Process Gear and Machine Company, Detroit, Mich., a corporation of Michigan Original application Aug. 19, 1953, Ser. No. 375,261, now Patent No. 2,780,080, dated Feb. 5, 1957. Divided and this application Nov. 26, 1956, Ser. No. 624,248

9 Claims. (Cl. 29—404)

This invention relates to improvements in a method of making a universal joint, and more particularly to a method of making a universal joint of the so-called ball and socket type, although the invention, as to its fundamental principles, might be utilized in the making of universal joints of other types, as will be apparent to one skilled in the art.

The instant application is a division of my copending application, entitled Universal Joint, filed August 19, 1953, Serial No. 375,261, now issued in Patent No. 2,780,080, dated February 5, 1957.

In the past, many and various types of universal joints have been developed, and likewise many and various methods of making them. The most popular of these formerly known joints, insofar as usage is is concerned, is the Hookes or cross-type joint. While that joint is objectionable for numerous reasons, its popularity in use was due to its economy of construction in comparison with more efficient joints. The cross-type joint is clearly the farthest away from constant velocity of substantially any type of universal joint; it is lacking in efficiency; it has little grease capacity; it has poor load carrying capacity; it has considerable back lash; and the method of making it, whether the yoke members be forged or cast, requires a number of expensive machining operations. Some so-called constant velocity universal joints have been developed, of which the Rzeppa and the Weiss joints are more commonly recognized as the most accurate in that regard. The method of making those joints, however, is prohibitively expensive for any common or reasonable commercial usage, and particularly so in the farm machinery and automotive fields of endeavor. The method of making those constant velocity joints heretofore known requires numerous highly expensive machining operations since the tolerance is a minimum, and involves an exceedingly expensive assembly operation due to the great number of parts utilized in such joints.

Some universal joints of the so-called ball and socket type have heretofore been attempted, at least to the constructive reduction to practice stage. That is, certain patents have been issued upon them. However, those joints embodied a socket on the end of one shaft, and a head or knuckle, the so-called ball, on the end of the other shaft and both the socket and the ball were complementally polygonal in cross-section and in certain instances the socket had plane faces inside. However, each face of the knuckle was curvate about some radius, and in some instances the knuckle was curvate both laterally and longitudinally of each face, but again about some predetermined radius. As a consequence, devices of this character never proved practical except in rare instances for a purpose that should properly be designated a shaft coupling, where the deviation between the shafts was a matter of a degree or two. Not any of these devices were capable of functioning as does the commonly known universal joint and permit an angle between the shafts in excess of a few degrees, and particularly did not permit any such angle up to 45 degrees. The method of making these knuckles or universal joint members was obviously merely a grinding operation or the equivalent to contour the joint faces in accordance with a predetermined radius. Such joints were clearly not constant velocity joints in any real sense of the word.

With the foregoing in mind, it is an important object of the instant invention to provide a simple and economical method of making one member of a universal joint, the resultant joint carrying more load, and operating far more efficiently than any joint as economically constructed heretofore.

Another object of the invention is the provision of a method of making a universal joint member which results in the provision of a universal joint that may be sold in competition with the most economical and inefficient form of universal joint now accepted by the trade, and yet the method results in the provision of a universal joint which compares favorably in operation with the expensive constant velocity joints.

Still another object of the instant invention is the provision of a method of making a universal joint member having working faces that are variably curvate in both directions and conjugate to a plane.

Also an object of this invention is the provision of a method of making a universal joint member having a plurality of working faces each of which is generated during manufacture in keeping with the ultimate movement of the joint member in actual operation.

A further feature of the instant invention is the provision of a method of making the knuckle element for a universal joint of the ball and socket type, which includes simulating the ultimate operating movement of the knuckle member during the cutting of the working faces thereon.

Still another object of the instant invention resides in the provision of a method of making a series of universal joint members, by first making a pattern member, including cutting the working faces of the pattern member while moving the member in simulation of the ultimate movement of a joint member, making a mold from such pattern member, and then successively casting the series of joint members from that mold.

While some of the more salient features, characteristics and advantages of the instant method have been above pointed out, others will become apparent from the following disclosures, taken in conjunction with the accompanying drawings, in which:

Figure 1 is a fragmentary part sectional, part elevational view illustrating a universal joint made in accordance with the instant method;

Figure 2 is an end elevational view of the socket member of the joint produced by the instant method;

Figure 3 is an end elevational view of the knuckle member made by the instant method, and diagrammatically indicating proportional dimensions;

Figure 4 is a side elevation of the knuckle member, also diagrammatically indicating proportional dimensions;

Figure 5 is a transverse vertical sectional view taken substantially as indicated by the line V—V of Figure 4 looking in the direction of the arrows, and also diagrammatically indicating proportional dimensions;

Figure 6 is a fragmentary part elevational, part sectional view illustrating a step in the practice of the instant method;

Figure 7 is a view similar in character to Figure 6, but illustrating particularly the practice of the method involved in this invention;

Figure 8 is a transverse vertical sectional view of a universal joint of somewhat different construction, but also capable of being made by the instant method; and Figure 9 is a fragmentary part sectional, part elevational view illustrating the method of making the knuckle member of the joint shown in Figure 8.

As shown on the drawings:

For purposes of clarity, and also better understanding of the instant invention, I will at this point give several definitions of the meanings of words used herein and in the appended claims.

The term "generate" is herein used in the sense it is most generally used in connection with gear teeth, to indicate forming with theoretical accuracy, and not merely shaping to a preconceived radius or other dimension.

The "angle of generation" or "generated angle" signifies the maximum angle of deviation of one shaft from direct alignment with the other shaft for which the joint is initially designed. For example, the angle X seen in Figure 1 is the generated angle, assuming that the maximum deviation from shaft alignment at which the joint will successfully operate is there present.

The term "conjugate" is also used in the sense that is most frequently used in connection with gear teeth, to signify that one part will drive the other part or be driven thereby with a constant velocity ratio.

Where the term "cone angle" is used in explaining the method of providing contact faces, that is to be considered the angle at the apex of a cone between diametrally opposed elements of the cone, and that angle will be twice the angle of generation.

It is apprehensible that the generated surfaces produced by the instant method and hereinafter discussed may be on one or the other members of the joint, that is, within the socket member or on the knuckle member, and herein and in the appended claims the invention is not to be considered limited to either member specifically, especially with regard to the broad aspects of the invention. Usually it will be found more convenient and more economical to provide the generated surfaces on the knuckle member, with plane faces in the socket member, and the invention is so set forth herein.

It will be also understood that with a universal joint made in accordance with the instant method, it makes no difference if either the socket or the knuckle is the driven member, while the other is the driving member.

In Figure 1 I have illustrated a universal joint of the ball and socket type, of which the knuckle member has been manufactured in accordance with the instant method. The universal joint comprises in general a socket 1 in which is disposed the head or knuckle 2 of a knuckle member comprising both the head and a stem or neck 3. The socket 1 may be welded or equivalently secured to the end of a shaft coupling 4 which, to all intents and purposes, may be considered the shaft itself. The neck 3 of the knuckle 2 may be equivalently firmly secured to the end of a hollow torque shaft 5. As seen clearly in Figure 1, the neck 3 is preferably narrow so that the parts of the joint may be assembled in a confined space and at a sharp angle to each other.

The socket 1 is preferably polygonal in cross-section, and has a plurality of plane interior faces 6, as seen in Figure 2. The knuckle 2 or "ball" is also polygonal in cross-section complementally to the socket member, and preferably intimately fits within the socket member. A spring ring or the equivalent 7 seated in a suitable groove in the end of the socket member may be utilized to prevent unintentional removal of the knuckle from the socket. Where there is a universal joint at each end of the torque shaft 5, it may be desirable to utilize a conical shaped compression spring 8 within the socket with the apical end of the spring seating centrally in the apex of a conical recess 2a in the knuckle 2, so as to eliminate undue wear. This spring also maintains the torque rod in a position of balance between a pair of universal joints, and it is not necessary to spline any of the shafts adjacent the joints since the knuckle may move backwardly and forwardly in the socket. The entire joint may be enclosed in a flexible boot 9 of synthetic rubber or equivalent material, which may be secured to each respective shaft in any suitable manner.

In Figure 1 the joint is shown with the shafts at a definite angle to each other. The angle X between the shafts may be the angle for which the faces on the knuckle 2 were generated, and if so, then the joint is illustrated in the maximum angular position of operation, but obviously the joint will operate at any angle between the angle X and zero degrees or shaft alignment.

For purposes of clarity, several important characteristics of the knuckle 2 will next be described. Since the socket is illustrated as a four sided polygon with four plane interior faces 6, the knuckle likewise will be provided with four faces 10 and, as will later appear, the knuckle may have slightly rounded corners. It should be noted, however, that the number of faces in the socket and on the knuckle is not critical. Usually, for ease of manufacture and durability there will be between 3 and 8 faces on these members, since an odd number functions the same as an even number.

Since, in operation, the center point of each face on the knuckle or ball does little or no work whatever, that center portion is preferably slightly recessed as indicated at 11 (in an exaggerated showing) to permit the passage of lubricant from one side of the knuckle to the other when the knuckle moves backwardly and forwardly inside the socket. This prevents the knuckle from acting as a piston and ensures adequate lubrication at all times.

As a result of the generation process for forming the faces on the knuckle, hereinafter described, these faces are not cylindrical. The faces might be described, for want of better terms, as variably curvate in both directions. That is, each face is generally curvate laterally of the knuckle and longitudinally of the knuckle, but in no case does the curvature follow the arc of a true circle and the curvature in various portions of a knuckle face is not the same as the curvature in other portions of that face.

As a result, it is substantially impossible to properly illustrate the exact character of a face on the knuckle. However, in Figures 3, 4 and 5, in order to make as full as possible a disclosure herein, I have set up proportionate dimensions of the knuckle that have proven satisfactory for a knuckle having an angle of generation of 30°. Obviously, these dimensions will vary for knuckles generated for a different angle. Likewise, actual dimensions of the knuckle and socket will vary in accordance with the amount of load the joint is to carry, and accordingly these dimensions are herein designated only proportionately.

As seen best in Figures 3 and 4, the maximum width of the knuckle transversely to its shaft axis is indicated by W, and this is the width from the high center point of one face to the high center point of an opposite face, before the lubricant-passing recesses 11 have been provided. Moving over half-way to the edge along the center of the face, a distance of ¼W, the dimension W1 will be approximately 99.6% of W. At the side edge of the joint another movement of ¼W, there is a dimension W2 which is approximately 98.9% of W.

Dimensions at the forward and rear edges of the knuckle will be the same and with reference more particularly to Figure 3, it will seem that the widest dimension at the forward edge, designated L, is approximately 91% of W. Half-way to the side along this forward edge there is the dimension L1 which is approximately 89% of W; and at the edge there is the dimension L2 which is approximately 86.6% of W.

Now in reference to Figure 4, the dimension T indicates the thickness of the knuckle, and that dimension is not a constant nor is it proportional to the dimension W. That is because thicknesses of knuckles will vary with the angle of generation, in that a small angle of generation does not require much thickness to have proper contact with the faces of the socket, whereas a larger angle of generation requires a thicker knuckle. In Figure 4 the section line designating the location of Figure 5 is taken half-way from the center of the face to the forward edge of the face, or ¼ T.

In Figure 5, the dimension M indicates the maximum width of the knuckle half-way between the forward edge and the center and this dimension M is approximately 97% of W. Halfway between M and the adjacent side edge of the knuckle, a distance of ¼ M, there is the dimension M1 which is approximately 96.4% of W; and at the edge the dimension M2 is approximately 94% of W.

As stated above, the aforesaid proportional dimensional relationships are approximate, due allowance being taken for mechanical errors, etc., and they are given herein for the purpose of indicating the general character of the faces on the knuckle. However, it is not necessary in the manufacture of the universal joint for these particular proportionate dimensions to be known to the operator, because if the faces on the knuckle are generated in the manner hereinafter described, the joint will operate, whether or not the operator has any idea concerning the resultant proportional dimensions.

During the making of the knuckle 2, it is preferably initially formed to approximately the desired size and shape, by forging or in equivalent manner, in order to reduce as much as possible the cutting operation on the faces during the generation of these faces. The faces may be generated one at a time, if so desired, but I have illustrated in Figures 6 and 7 an arrangement whereby all of the faces may be generated at the same time. To this end, there are provided four identical cutting means, each comprising a driving element such as a motor 12, a shaft 13, and a cutting tool 14. Each cutting tool is preferably of substantially hourglass shape and includes a pair of truncated conical cutting members 15 and 16 with a spacer element 17 disposed therebetween, if so desired. With cutting elements of this shape, the aforesaid slightly rounded corners, indicated at 18 are provided on the knuckle, but these slightly rounded corners do not interfere in any manner with the operation of the joint.

Preferably, the cutting elements 15 and 16 for each tool provide a straight line cut or cutting contact against the knuckle 2, and with this arrangement each cutting element 15 and 16 generates ½ a face on the knuckle. It is not necessary for any tool to cut in the vicinity of the lubricant-passing recess 11 in each face of the knuckle, although it will be understood that if a recess is not desired, a single cutting tool may generate an entire face.

During the generation of the faces, a cutting tool does not move except by way of rotation on its own axis. The knuckle is held in any suitable manner against rotation about its own axis, and by any other suitable mechanism the knuckle is bodily gyrated or oscillated so that its axis defines an imaginary cone, indicated by the dotted line 19 in Figure 7, the apex of this imaginary cone being preferably at the center of the knuckle or ball 2, although in some instances that particular location may not be essential. The cone angle of the imaginary cone will be twice the generated angle of the knuckle, so that half the cone angle is the maximum angle of deviation from shaft alignment for which that particular knuckle is intended to operate satisfactorily. The generated angle may be anything desired from zero degrees to 45 degrees.

It will be especially noted that by this method of forming the knuckle faces, each face is generated conjugately to a plane surface, the line contact with the cutting element acting as the plane surface. During generation, the knuckle is given a movement in simulation of the movement it will have in actual usage. Therefore, assuming perfection in the mechanical work, a joint of the character illustrated herein must provide constant velocity at the generated angle, as well as at zero degrees. The joint may vary slightly, and in most cases that will be but a very slight variation, from constant velocity at angles intermediate zero degrees and the generated angle. That slight variance from constant velocity in such intermediate region may be considerably reduced by providing more faces on the knuckle.

It will be noted, therefore that the knuckle will operate smoothly against the plane faces in the socket member, whereas a knuckle having faces defined by true curvature around a predetermined center would cause a fracture of the joint in a single revolution if the deviation from shaft alignment was more than one or two degrees.

In the event the knuckle is the joint member provided with the generated faces, as herein set forth, the socket 1 need be only a stamping or a drawing of sufficient accuracy to provide substantially plane interior faces for the knuckle to operate against.

In Figures 8 and 9 I have illustrated a method of forming a knuckle 20 having a stem 21, which may be termed a knuckle with 8 faces, each face being fluted or angled inwardly to a lubricant-passing recess 22. This knuckle will operate satisfactorily within a fluted socket 23, shown in Figure 8.

The knuckle 20 is generated in substantially the same manner as the previously described knuckle 2. However, different tools are required. To this end, four sets of generating mechanism or cutting tools are disclosed, each set including a motor 24, a shaft 25, and a cutting tool 26. Each cutting tool 26 consists of a pair of confronting urn-shaped cutting elements 27 and 28 separated by a suitable spacer 29 therebetween. Each such cutting tool will generate the sum total of two faces on the knuckle, including one complete inwardly angled face and one-half each of two adjacent faces. During the generation of the faces on the knuckle 20, the knuckle is held against rotation and gyrated or oscillated about its axis to provide a desired angle of generation, in the manner above described.

The instant invention also contemplates the molding or casting of universal joint members, such method perhaps being more desirable for quantity production. In such event, a pattern member would be generated in the manner above described, and a mold made from that pattern member. Then, a series of joint members might be molded, cast, die cast, or equivalently made from the molds or dies resulting from the pattern member. Such process is sufficiently known in the art as not to warrant illustration of the dies or molds herein.

It may be mentioned that for agricultural machinery and the like, a knuckle with four faces is quite sufficient and satisfactory, and for most uses of universal joints, including automotive vehicles, a knuckle having four or six faces is quite satisfactory, with substantially constant velocity resulting. In any event, the deviation from true constant velocity would not be material. The structure indicated in Figures 8 and 9 would be most frequently used for more specialized and accurate machinery where the cost of the universal joint would be secondary in consideration, and constant velocity desired to a closer tolerance. While the difference in manufacturing cost between the production of the knuckle 2 and the knuckle 20 is not very great by the practice of the instant invention, yet even a slight different in cost is almost paramount in highly competitive fields of endeavor such as the automotive industry.

From the foregoing, it is apparent that I have provided a method of making a universal joint that is extremely simple and economical to practice, requires the use of only economical and long lasting mechanism, and which results in the provision of a universal joint highly efficient in operation and closely approaching constant velocity throughout the angle of generation.

It will be understood that modifications and variations may be effected without departing from the scope of the novel concepts of the present invention.

I claim:
1. The method of making the knuckle member for a universal joint of the ball and socket type wherein the socket has a plurality of plane faces, including the steps of roughly forming a knuckle member with an equal number of working faces, and then finishing each face of the knuckle member by oscillating the same against a cutting tool in a manner to include all angular bearing relationships said working face will ultimately assume in operation of the joint.

2. The method of making a universal joint member with the aid of a cutting tool, including the steps of generating a face on the joint member by oscillating the joint member with its axis describing a conical path of which the cone angle is twice the intended maximum angle at which the member is to ultimately operate, holding the member against rotation about its axis, and applying a cutting tool to the face of the member with the tool rotating about its axis but otherwise held stationary.

3. The method of generating the knuckle member of a universal joint of the ball and socket type, including the steps of spinning a cutter having a straight line cutting contact on its axis and holding the cutter otherwise stationary, oscillating a face of the knuckle against the cutter by moving the knuckle so its axis defines a cone having a cone angle twice the angle for which the knuckle is being generated, and holding the knuckle against rotation about its axis.

4. The method of making the knuckle member of a universal joint of the ball and socket type, wherein the socket has a plurality of plane inside faces, including the steps of providing an equal number of faces on the knuckle member, and then contouring each face of the knuckle member by placing it against a cutting tool and oscillating the knuckle member so its axis will outline a right cone while holding the knuckle against rotation about its axis.

5. The method of making the knuckle member of a universal joint of the ball and socket type, wherein the socket has a plurality of plane inside faces, including the steps of providing an equal number of faces on the knuckle member, placing all the faces of the knuckle member against rotating cutting tools, and oscillating the knuckle member so its axis defines a cone having an apex at the center of the knuckle while holding the knuckle member against rotation about its axis.

6. The method of making the knuckle member of a universal joint of the ball and socket type, wherein the socket has a plurality of plane inside faces, including the steps of providing an equal number of faces on the knuckle member, placing all of the faces of the knuckle member against rotating cutting tools and simultaneously grinding said faces while bodily oscillating the knuckle member so its axis defines a cone having an apex at the center of the knuckle and holding the knuckle member against rotation about its axis, and wherein the angle between diametrally opposed elements at the apex of the cone is twice the angle from shaft alinement for which the universal joint is intended.

7. The method of generating a working face on one member of a universal joint, including the steps of holding the member against rotation about its axis, and oscillating the member bodily against a cutting tool in a manner to include all angular bearing relationships said working face will ultimately assume in operation of the joint.

8. The method of generating a working face on one member of a universal joint, including the steps of holding the member against rotation about its axis, and oscillating the member bodily against a cutting tool in a manner to include all angular bearing relationships said working face will ultimately assume in operation of the joint, and then using said member in the making of a mold from which to cast other joint members.

9. The method of generating the knuckle member of a universal joint of the ball and socket type, including the steps of spinning a cutter having a straight line cutting contact on its axis and holding the cutter otherwise stationary, oscillating a face of the knuckle against the cutter by moving the knuckle so its axis defines a cone having a cone angle twice the angle for which the knuckle is being generated, and holding the knuckle against rotation about its axis, and then using the generated knuckle member as a pattern from which to make a mold to cast other similar knuckle members.

References Cited in the file of this patent

UNITED STATES PATENTS

| | | |
|---|---|---|
| 1,674,753 | Witter | June 26, 1928 |
| 1,770,502 | Weiss | July 15, 1930 |
| 1,985,531 | Swenson | Dec. 25, 1934 |
| 2,055,421 | Weiss | Sept. 22, 1936 |
| 2,304,666 | Sturgess | Dec. 8, 1942 |
| 2,394,890 | Blomgren | Feb. 12, 1946 |
| 2,425,809 | Johnson | Aug. 19, 1947 |